(12) United States Patent
Kubo et al.

(10) Patent No.: US 8,637,422 B2
(45) Date of Patent: Jan. 28, 2014

(54) METHOD FOR PRODUCING SURFACE-SUPPORTED CATALYST

(75) Inventors: Hitoshi Kubo, Tsukuba (JP); Yuusuke Ohshima, Ibaraki (JP); Tomoko Ishikawa, Tsukuba (JP); Junichi Taniuchi, Ibaraki (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 0 days.

(21) Appl. No.: 13/578,067

(22) PCT Filed: Mar. 29, 2011

(86) PCT No.: PCT/JP2011/057756
§ 371 (c)(1),
(2), (4) Date: Aug. 9, 2012

(87) PCT Pub. No.: WO2011/122603
PCT Pub. Date: Oct. 6, 2011

(65) Prior Publication Data
US 2012/0316055 A1    Dec. 13, 2012

(30) Foreign Application Priority Data

Mar. 29, 2010   (JP) .................................. 2010-075808

(51) Int. Cl.
*B01J 31/00* (2006.01)

(52) U.S. Cl.
USPC ........... 502/150; 502/326; 502/302; 502/327; 502/350; 502/415; 502/325; 502/10; 502/172

(58) Field of Classification Search
USPC ......... 502/326, 302, 303, 304, 327, 329, 331, 502/332, 333, 334, 339, 340, 341, 345, 346, 502/349, 350, 351, 355, 415, 439, 325, 10, 502/150
See application file for complete search history.

(56) References Cited

U.S. PATENT DOCUMENTS

| 6,528,031 | B1 | 3/2003 | Park et al. ................. 423/239.2 |
| 6,797,243 | B2 * | 9/2004 | Arcuri et al. ................. 422/211 |
| 2002/0192515 | A1 * | 12/2002 | Bachinger et al. ............. 429/20 |
| 2007/0135300 | A1 | 6/2007 | Kagami et al. ................ 502/208 |

FOREIGN PATENT DOCUMENTS

| JP | 48-53980 | 7/1973 |
| JP | 2000-308831 | 11/2000 |
| JP | 2002-001115 | 1/2002 |
| JP | 2005-185962 | 7/2005 |
| JP | 2006-297313 | 11/2006 |
| JP | 4361130 | 11/2009 |
| JP | 2010-194428 | 9/2010 |

* cited by examiner

*Primary Examiner* — Colleen Dunn
*Assistant Examiner* — Haytham Soliman
(74) *Attorney, Agent, or Firm* — Roberts & Roberts, LLP

(57) ABSTRACT

A method for supporting a catalytic metal on the surface of a carrier by bringing an aqueous catalytic metal salt solution into contact a porous carrier. The method includes the steps of: impregnating the carrier with a liquid hydrophobic organic compound before bringing the aqueous catalytic metal salt solution into contact with the carrier, and drying the impregnated carrier to volatilize the hydrophobic organic compound on the surface of the carrier, followed by bringing the carrier into contact with the aqueous catalytic metal salt solution; and then bringing a reducing agent into contact with the catalytic metal salt on the surface of the carrier to reduce the catalytic metal salt to undergo insolubilization treatment. The catalytic component is supported in a region from the surface of the carrier to a depth of 50 μm or more and 500 μm or less. The supported state of the catalytic component is made controllable, and the catalytic component can be supported in the inner part of the carrier with a suitable depth.

4 Claims, 1 Drawing Sheet

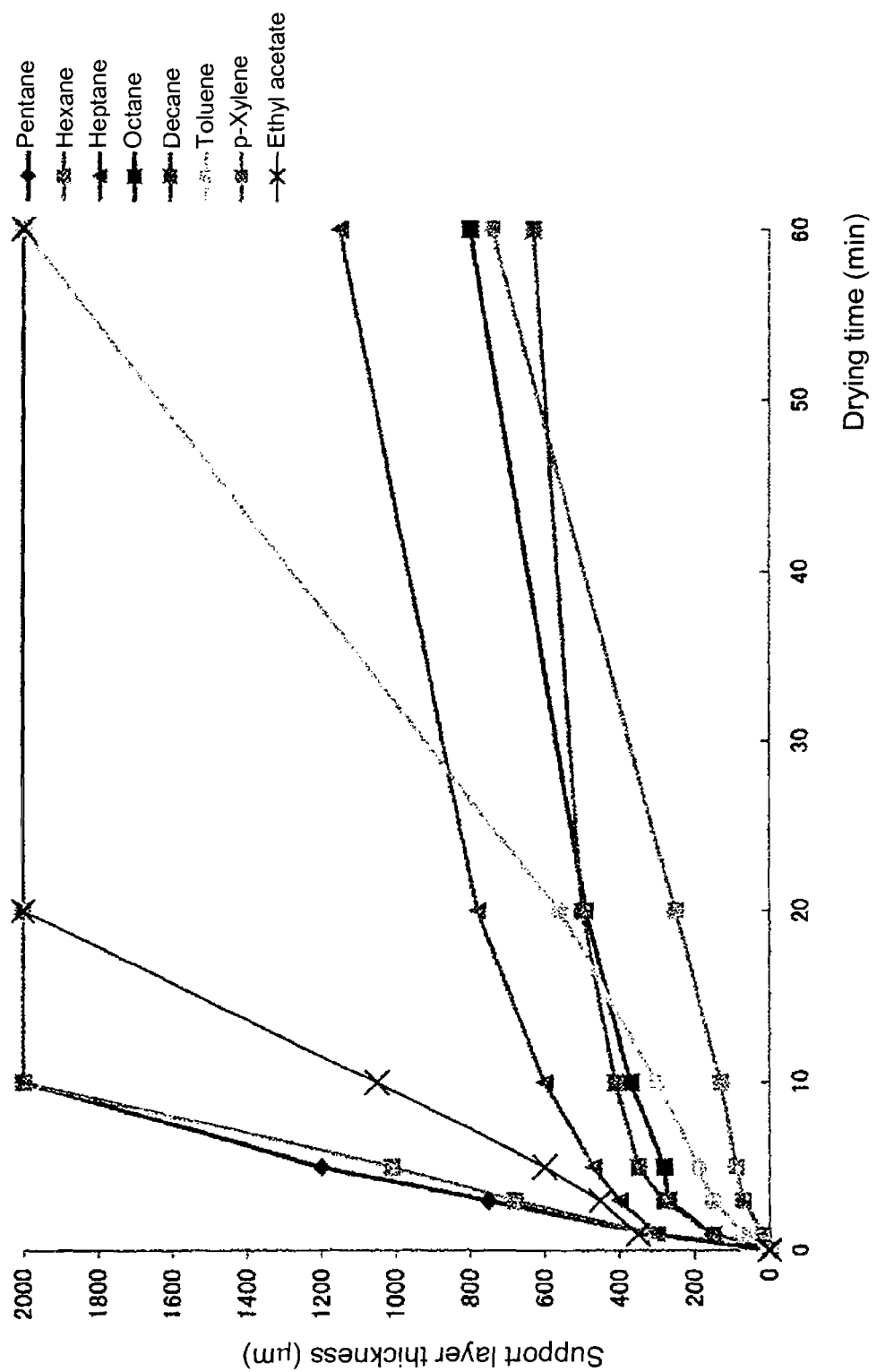

METHOD FOR PRODUCING SURFACE-SUPPORTED CATALYST

BACKGROUND OF THE INVENTION

1. Field of the Invention

The present invention relates to a method for supporting a catalytic metal on the surface of a carrier, and particularly relates to a method for controlling the supported depth of a catalytic component within a suitable range.

2. Description of the Related Art

A supported catalyst in which a catalytic component is supported on the surface of a carrier having a large specific surface area has been industrially widely used for economical reasons that the amount of the catalytic component to be used can be reduced by supporting the catalytic component with a high degree of dispersion.

In such a supported catalyst, it is the catalytic component on the surface of the carrier that contributes to a catalytic reaction, and the catalytic component in the inner part of the carrier can hardly contribute to a catalytic reaction. Consequently, if the catalytic component in the inner part of the carrier which cannot contribute to a catalytic reaction reaches an amount that cannot be ignored as compared with the amount of the catalytic component on the surface of the carrier, problems are that the loss of the catalytic component will occur and that the reaction efficiency per the amount of the catalytic component will be reduced. Particularly, in the case where an expensive precious metal or the like is used as a catalytic component, the cost for producing a practical supported catalyst will be increased because the catalytic component is also supported in the inner part of the carrier.

Accordingly, in order to increase the reaction efficiency of the supported catalyst, it is desirable to support the catalytic component only on the surface of the carrier and its vicinity, and several methods for producing such a supported catalyst have been proposed.

One of these methods is a method of impregnating a porous carrier with an acetone solution or an acetone-water mixed solution of a palladium compound and carrying palladium metal or a palladium compound on the surface part of the porous carrier, as described in Patent Literature 1. According to this method, 97% of the palladium catalyst can be adhered to a region from the surface of the carrier to a depth of 0.2 mm or less (Patent Literature 1, Example 1).

Further, as described in Patent Literature 2, there is a method of placing a carrier supporting a basic metal salt component of at least one metal of group 1 metals or/and group 2 metals of the periodic table into a solution containing a palladium compound and a tellurium compound held at a temperature of 60° C. or more and 100° C. or less to bring them into contact with each other so as to carry palladium and tellurium on the carrier. According to this method, a phenyl ester-synthesizing catalyst can be produced in which the amount of palladium and tellurium carried in a surface layer part ranging from the outside surface of a carrier to a depth of 20% of a radius to the center of the carrier is 70% or more of the total amount of palladium carried and 50% or more of the total amount of tellurium carried, respectively (Patent Literature 2, Claim 1).

However, it is difficult to completely control the supported state of the catalytic component by the method of Patent Literature 1, and the catalytic component cannot be prevented from diffusing into the inner part of the carrier. Accordingly, even the above method allows about 3% of the palladium catalyst to be diffused into the inner part of the carrier, and it is difficult to control the localized depth of the catalytic component from the surface of the carrier.

Also, with respect to the method described in Patent Literature 2, it is difficult for the catalyst present in a part ranging from the outside surface of a carrier to a depth of 20% of a radius to the center of the carrier to sufficiently contribute to a catalytic reaction. Therefore, the catalyst is required to be supported in closer vicinity of the surface. Further, about 30% of the total amount of palladium carried will diffuse into the inner part of the carrier, and the effect of the catalyst is not sufficient in consideration of production cost and catalytic activity.

The present inventors have disclosed a method described in Patent Literature 3 against the prior art as described above. This method includes preliminarily impregnating a carrier with a specific liquid compound to allow the compound to diffuse into the inner part of the carrier and then solidifying the compound in the inner part of the carrier, before bringing the carrier into contact with a catalytic metal salt (Patent Literature 3: Claim 1). This method can prevent the catalytic component from diffusing into the inner part of the carrier and allows the catalytic component to be supported only on the surface of the carrier and its vicinity.

The above method by the present inventors is superior in that the catalytic component is supported only on the extreme surface of the carrier. However, in this method, it is necessary to solidify the impregnated compound in the inner part of the carrier, and it is also necessary to remove the solidified compound from the inner part of the carrier after the catalytic component on the surface of the carrier is immobilized. For this reason, such a process of producing a supported catalyst includes relatively complicated steps.

CITATION LIST

Patent Literature

[Patent Literature 1] Japanese Patent Appl. Laid-Open No. 48-53980
[Patent Literature 2] Japanese Patent Appl. Laid-Open No. 2005-185962
[Patent Literature 3] Japanese Patent Registration No. 4361130

SUMMARY OF THE INVENTION

Problem to be Solved by the Invention

As described above, the supported state of the catalytic component on the carrier influences production cost and catalytic activity. In view of the problems in the above prior art, it is required that the supported state of the catalytic component (the supported depth and the presence or absence of the diffusion of the catalytic component) can be controlled. An object of the present invention is to solve these problems and to provide a simpler method for producing a supported catalyst having high catalytic activity.

Means for Solving the Problem

In order to solve the problems as described above, the present inventors have intensively studied the optimum supported state of the catalytic component and means for controlling the same. As a result, the following two improved points have been assumed. First improved point is as follows. With respect to the supported depth of the catalytic component, it is naturally not preferable that the depth be excessive, but it is not necessarily satisfactory to support the catalytic component only on the surface (outermost surface of a carrier), and it is preferable to set a certain degree of depth. This is because a catalyst supporting a catalytic component on the outermost surface may undergo abrasion by the mutual contact of catalysts in the course of use, which may lead to the loss of the catalytic component. Thus, prime importance was placed on the control of the supported depth of a catalyst by setting a value of 50 μm or more and 500 μm or less (more preferably 70 μm or more and 300 μm or less) as a preferred supported depth to be specified by the present inventors.

Second improved point is to eliminate the concentration gradient of the catalytic component. In the carrier, an intermediate region having a low catalytic component concentration is present on the boundary between a surface region supporting the catalytic component and an internal region not supporting the catalytic component. This was a phenomenon observed in the above Patent Literature 3. Such an intermediate region, which will have a low contribution to a catalytic reaction, is probably formed because when the carrier is first filled with water (ice) and then impregnated with an aqueous solution of the catalytic component, the ice on the boundary part is dissolved to dilute the aqueous solution. Thus, a preferred form of the supported state is to provide a state in which the contrast between the presence and the absence of the catalytic component is clear.

The present inventors have studied on the basis of the above improved points and, as a result, have found a method including preliminarily impregnating the carrier with a liquid hydrophobic organic compound to allow the compound to diffuse into the inner part of the carrier before bringing the carrier into contact with a catalytic metal salt and then volatilizing only the hydrophobic organic compound on the surface of the carrier, followed by bringing the carrier into contact with an aqueous catalytic metal salt solution (hydrophilic). The application of the hydrophobic organic compound can prevent the catalytic component from diffusing into the inner part of the carrier due to the relationship between hydrophobicity and hydrophilicity, and can provide a state in which the contrast between the presence and the absence of the catalytic component is clear. Further, it has been assumed that the control of the supported depth of the catalytic component can be facilitated by utilizing the volatility of the hydrophobic organic compound.

Specifically, the present invention provides a method for supporting a catalytic metal on the surface of a carrier by bringing an aqueous catalytic metal salt solution into contact with the porous carrier, the method including the steps of: impregnating the carrier with a liquid hydrophobic organic compound before bringing the aqueous catalytic metal salt solution into contact with the carrier, and drying the impregnated carrier to volatilize the hydrophobic organic compound on the surface of the carrier, followed by bringing the carrier into contact with the aqueous catalytic metal salt solution; and then bringing a reducing agent into contact with the catalytic metal salt on the surface of the carrier to reduce the catalytic metal salt to undergo insolubilization treatment, wherein the catalytic component is supported in a region from the surface of the carrier to a depth of 50 μm or more and 500 μm or less.

The features of the method for supporting a catalytic metal on the surface of a porous carrier according to the present invention will be described in detail. The features of the present invention can be roughly divided into two steps. The first step is for making preparations before bringing the catalytic metal into contact with the carrier and includes the steps of impregnating the porous carrier with a hydrophobic organic compound in a liquid state and volatilizing the hydrophobic organic compound on the surface of the carrier by drying. The second step is for supporting the catalytic metal on the surface of the carrier and, following the first step, includes the steps of bringing the carrier into contact with an aqueous catalytic metal salt solution and reducing the catalytic metal salt on the surface of the carrier.

First, the impregnation of the porous carrier with a predetermined compound is to prevent the catalytic metal from diffusing into the inner part of the carrier by preliminarily filling the voids in the inner part of the carrier, and the impregnation is performed before the catalytic metal is brought into contact with the carrier.

On this occasion, the compound with which the carrier is impregnated is a liquid hydrophobic organic compound. This is because when the compound is liquid, the carrier can be impregnated with the compound in ordinary temperature (15 to 45° C.) and ordinary pressure conditions without providing a special facility. In addition, use of the hydrophobic organic compound facilitates to prevent the hydrophilic aqueous catalytic metal salt solution from diffusing into the inner part of the carrier.

From such a point of view, the liquid hydrophobic organic compound preferably has a molecular weight of 70 to 200. This is because when the molecular weight is within the above range, the hydrophobic organic compound will not be gas or solid but remains liquid in ordinary temperature (15 to 45° C.) and ordinary pressure conditions, and therefore the carrier can be impregnated with the compound. Here, the carrier can be impregnated with a hydrophobic organic compound having a molecular weight exceeding 200 if it is liquid, but it will take too much time for the carrier to be impregnated with the compound into the inner part thereof if the compound has a too large molecular weight. Thus, taking the impregnation efficiency into consideration, the upper limit of the molecular weight is preferably about 200.

The vapor pressure of the hydrophobic organic compound at 25° C. is preferably from 1.0 mmHg to 520 mmHg. In order to effectively support the catalyst on the surface of the carrier, it is necessary to take the volatilization characteristics of the hydrophobic organic compound into consideration. Specifically, it is preferable to exclude both easily volatile and hardly volatile hydrophobic organic compounds by limiting the vapor pressure thereof as a measure of volatilization characteristics. For example, when an easily volatile hydrophobic organic compound is used, the catalyst will permeate not only the surface of the carrier but also the inner part of the carrier which cannot exhibit the catalytic activity. Further, when a hardly volatile hydrophobic organic compound is used, it not only takes time to volatilize the hydrophobic organic compound on the surface of the carrier by drying, but the hydrophobic organic compound remains in the inner part of the carrier after the catalyst is supported, which has a risk of causing troubles in the future. In order to avoid such troubles and to efficiently support the catalyst on the surface of the carrier, the vapor pressure is preferably within the range as described above.

Further, the boiling point of the hydrophobic organic compound is preferably from 35° C. to 180° C. This is because handling will be difficult if the hydrophobic organic compound is boiling when it is brought into contact with a carrier, and because it is necessary to take volatilization characteristics into consideration similar to the reason for limiting the vapor pressure as described above. When the boiling point is within the range as described above, the catalyst can be effectively carried on the surface of the carrier.

Further, the hydrophobic organic compound preferably has a solubility in water of from 0 g/100 ml to 10 g/100 ml. This is because if the solubility in water is too high, the aqueous catalytic metal salt solution will dissolve in the organic compound and the catalytic component will permeate the inner part of the carrier. In the present invention, when the hydrophobic organic compound has a solubility in water within a range as described above, the catalyst can be effectively supported on the surface of the carrier.

Specific examples of the hydrophobic organic compound include pentane, hexane, heptane, octane, nonane, decane, toluene, xylene, and ethyl acetate, and at least one of these compounds correspond to the liquid hydrophobic organic compound that satisfies the conditions such as the molecular weight, vapor pressure, boiling point, and solubility in water as described above.

Those particularly preferred among the above organic compounds are hexane, heptane, octane, toluene, xylene, and ethyl acetate, when the controllability of the supported depth is taken into consideration. Hexane, heptane, and ethyl acetate each have a relatively high volatilization rate because they each have a low boiling point and a high vapor pressure, and therefore the supported depth can be easily controlled to around 300 μm. Since octane has a volatilization rate a little lower than the former, it is suitable for a supported depth of around 150 μm. Since xylene and toluene each have a further lower volatilization rate, they can be used for controlling the supported depth to a shallow, fine depth of around 100 μm. Thus, the design of the supported depth is achieved by using chemical liquids properly. Note that although xylene and toluene may be used for obtaining a supported depth of 300 μm or more, it is preferable to properly use the organic compound depending on the supported depth, because since they have a low volatilization rate, the ease of volatilization will be different according to a location, and a certain level of unevenness of the supported depth may be produced.

A method for impregnating a carrier with a hydrophobic organic compound includes a method of immersing the carrier in a container containing the hydrophobic organic compound and a method of spraying the hydrophobic organic compound. The amount of the hydrophobic organic compound with which a carrier is impregnated is preferably from 50% by mass to 100% by mass of the oil absorption of the carrier. A carrier can be impregnated with a sufficient amount of hydrophobic organic compound for preventing a catalytic metal from diffusing into the inner part of the carrier by setting about 80% by mass of the oil absorption of the carrier as a target. For example, by using a method of immersing a carrier in a container containing the hydrophobic organic compound, the carrier can be impregnated with a liquid in an amount of 80% by mass or more of the oil absorption by immersing the carrier for about two hours.

Here, the oil absorption as used in the present invention refers to the difference between the mass of a carrier when a carrier in an absolute dry state is impregnated with a hydrophobic organic compound until the carrier is in a saturated state and the mass of a carrier in an absolute dry state. By defining the oil absorption in this way, the proportion of how much the carrier is impregnated with the hydrophobic organic compound can be calculated. For example, the case where the amount of the hydrophobic organic compound with which the carrier is impregnated is 100% by mass of the oil absorption refers to a case where the hydrophobic organic compound permeates all the voids of the carrier in an absolute dry state and the carrier is in a saturated state.

The step of sufficiently impregnating the carrier with the hydrophobic organic compound is followed by the step of drying the impregnated carrier to volatilize the hydrophobic organic compound on the surface of the carrier. When the carrier is dried, the hydrophobic organic compound in the inner part of the carrier will volatilize preferentially from the surface of the carrier in contact with the outside air. By utilizing this property, the support layer thickness of the catalytic metal can be controlled by regulating a drying condition in this step.

The method of drying the carrier includes any method as long as it can volatilize the hydrophobic organic compound on the surface of the carrier. Examples include a method of still standing the carrier in an ordinary temperature (15 to 45° C.) and ordinary pressure condition or in a heating condition for a predetermined time and a method of applying warm air to the carrier.

It is preferable to volatilize 10% by mass to 75% by mass of the hydrophobic organic compound with which the carrier is impregnated by drying the carrier by any of the methods as described above. This is because when the hydrophobic organic compound is volatilized within this range, the carrier will not be impregnated with the catalytic metal into the inner part thereof, and the catalytic metal can be supported only on the surface of the carrier and its vicinity. If the amount of volatilization is less than 10% by mass, the hydrophobic organic compound may partially remain on the surface of the carrier due to insufficient volatilization, and the catalyst may not be supported on all areas of the surface of the carrier. Further, if the amount of volatilization exceeds 75% by mass, a production cost and catalytic activity will be adversely affected because the catalyst will be supported even in the inner part of the carrier.

Preferably, the catalyst exhibits its effect by being supported in a region from the surface of the carrier to a depth of about 300 μm. Generally, a spherical carrier having a diameter of from about 2 mm to about 4 mm is used. Based on the above, in order to support the catalyst in a region from the surface of the carrier to a depth of about 300 μm, the hydrophobic organic compound with which the carrier is impregnated needs to be volatilized in an amount of 39% by mass to 68% by mass thereof in the case where the carrier has a diameter of 2 mm, 27% by mass to 50% by mass in the case of 3 mm, and 20% by mass to 40% by mass in the case of 4 mm. Thus, for effectively carrying the catalyst, it is more preferable to volatilize 20% by mass to 68% by mass of the hydrophobic organic compound with which the carrier is impregnated.

The step of volatilizing the hydrophobic organic compound on the surface of the carrier is followed by the step of bringing the carrier into contact with an aqueous catalytic metal salt solution. A method for bringing the carrier into contact with an aqueous catalytic metal salt solution includes a method of immersing the carrier in the aqueous catalytic metal salt solution and a method of spraying the hydrophobic organic compound on the carrier.

After bringing the catalytic metal salt into contact with the surface of the carrier by the above treatment, the catalytic metal salt is reduced for insolubilization. This reduction step is for insolubilizing the water-soluble catalytic metal salt as a pure metal or as an oxide or hydroxide complex or compound to thereby prevent the catalytic metal from dissolving in the aqueous catalytic metal salt solution or in a liquid in the inner part of the carrier and flowing out of the surface of the carrier. Thereby, the catalytic metal can be fixed to the surface of the carrier. The reduction method may be a liquid phase reduction or a vapor phase reduction as long as the catalytic metal can be fixed. Examples of the liquid phase reduction include a method of immersing a carrier in an aqueous ammonia solution, and examples of the vapor phase reduction include a method of subjecting a carrier to hydrogen heat treatment by heating.

Reducing agents used for the insolubilization treatment of the catalytic metal include compounds with reducing action such as ammonia, hydrazine, and sodium borohydride, reducing gases such as hydrogen, and basic compounds such as sodium hydroxide. Specific methods of the reduction step include a deposition precipitation method by adding alkali to an acid-based catalytic metal salt.

In the present invention, the step of reducing the catalytic metal salt on the surface of the carrier as described above may be followed by heat treatment. The heat treatment is a step of reducing the catalytic metal which has been converted into an oxide or hydroxide complex or compound in the above reduction step to pure metal and removing impurities. In the case where a plurality of catalytic metals of different metal species is used, the heat treatment is also a step of alloying them. The above vapor phase reduction may serve as a heat treatment step.

Heat treatment may be performed under conditions generally conventionally known, and an example includes heating at 500° C. for two hours. The heat treatment can also completely volatilize the hydrophobic organic compound with which the inner part of the carrier is impregnated.

The porous carrier is preferably an oxide-based ceramic. This is because an oxide-based ceramic is chemically stable, and conventionally, has been widely used as a suitable material for supporting a catalytic metal. When a bonding strength with the catalytic metal is taken into consideration, the porous carrier preferably includes at least one of alumina, silica, zeolite, zirconia, ceria, titania, carbon, and diatomaceous earth, and more preferably includes alumina, silica, zirconia, and zeolite.

The shape of the porous carrier is preferably a spherical shape, a rod shape, a cylindrical shape, and a hollow cylindrical shape. First of all, a catalyst in a form having a large specific surface area (for example, a fine powdered form) is advantageous compared with a catalyst in a grain or massive form because the former has a larger number of active sites per weight than the latter, but the former has a difficulty in handling because it tends to aggregate. Thus, a carrier is used for fixing (supporting) the catalyst in order to facilitate the handling of the catalyst, and a carrier having a shape as described above has been used. Note that in the present invention, a spherical shape, a rod shape, a cylindrical shape, and a hollow cylindrical shape include those having a circular or elliptical cross section.

The aqueous catalytic metal salt solution may be an aqueous solution containing a metal salt which can undergo reduction or formation of a hydroxide. Examples include aqueous platinum group metal salt solutions such as an aqueous platinum salt solution, an aqueous rhodium salt solution, an aqueous palladium salt solution, an aqueous ruthenium salt solution, and an aqueous iridium salt solution, an aqueous silver salt solution, an aqueous gold salt solution, an aqueous transition metal salt solution, an aqueous boron salt solution, an aqueous aluminum salt solution, an aqueous silicon salt solution, an aqueous gallium salt solution, an aqueous germanium salt solution, an aqueous indium salt solution, an aqueous tin salt solution, an aqueous antimony salt solution, an aqueous tellurium salt solution, an aqueous bismuth salt solution, an aqueous solution of zinc salt, aqueous rare earth salt solutions such as an aqueous ceric salt solution, aqueous alkali metal salt solutions, and aqueous alkaline earth metal salt solutions. The solution is not limited to aqueous solutions, but a solution of a catalytic metal salt in an organic solvent can also be used.

In the present invention, these aqueous catalytic metal salt solutions may be used alone or in combination. These aqueous catalytic metal salt solutions have been conventionally used because they have high catalytic activity and high bonding strength with the oxide-based ceramic used as a carrier.

Note that in the case where a catalytic metal is supported on a carrier, an aqueous catalytic metal salt solution having a metal concentration of from 0.1% by mass to 15% by mass is generally used as the above aqueous catalytic metal salt solution, and also in the present invention, an aqueous catalytic metal salt solution having a metal concentration within this range can be used.

Effect of the Invention

As described above, according to the production method of the present invention, the catalytic component can be prevented from permeating the inner part of the carrier, and thereby, a surface-supported catalyst having high catalytic activity can be produced inexpensively and in a simpler manner.

BRIEF DESCRIPTION OF THE DRAWING

FIG. 1 is a view showing the relationship between the drying time and the support layer thickness in the case of using various types of hydrophobic organic compounds.

DETAILED DESCRIPTION OF THE PREFERRED EMBODIMENTS

Hereinafter, the embodiments of the present invention will be described. First, in the first embodiment, the relationship between the time for volatilizing the hydrophobic organic compound in the carrier by drying and the catalytic metal-supported depth is studied using an alumina carrier, an aqueous platinum salt solution, and toluene as a hydrophobic organic compound. Next, in the second embodiment, a case using an alumina carrier, an aqueous platinum salt solution, and a hydrophobic organic compound different from that in the first embodiment is studied. Then, in the third embodiment, the results of using toluene as a hydrophobic organic compound and using a carrier and a catalytic metal different from those in the first embodiment, a conventional example, and a comparative example are studied.

First Embodiment

Spherical alumina carriers each having a diameter of 4 mm in an absolute dry state were immersed in a beaker containing toluene. The carriers were immersed until they were impregnated with toluene in an amount of the total amount (100% by mass) of the oil absorption of the carriers, and then the carriers were pulled out of the beaker, allowed to stand in ordinary temperature (20° C.) and ordinary pressure conditions in a manner that the carriers are not brought into contact with each other, and dried for a predetermined time to volatilize toluene on the surface of the carriers. Immediately after that, the carriers were immersed in a beaker containing an aqueous platinum salt solution and subsequently immersed in an aqueous ammonia solution to thereby deposit the catalytic metal on the surface of the carriers. Note that toluene has a molecular weight of 92, a vapor pressure of 22 mmHg (20° C.), a boiling point of 110.6° C., and a solubility of 0.47 mg/100 ml.

After the above treatment is performed, the carriers were divided into halves, the cross sections of which were observed with EPMA to measure the thickness of the layer supporting the catalyst, and the resulting thickness was defined as a support layer thickness (supported depth) of the catalyst. The volatilization rate was determined by first defining oil absorption as a difference between the mass of the carrier when the carrier in an absolute dry state was impregnated with a hydrophobic organic compound until the carrier was in a saturated state and the mass of a carrier in an absolute dry state and then calculating the ratio of the difference (defined as A) between the mass of the carrier in a saturated state and the mass of the carrier after drying for a predetermined time to the oil absorption in the unit of % by mass (Expression 1). Table 1 shows the results of the relationship among the drying time of the carrier, the amount of volatilization, and the support layer thickness.

[Expression 1]

Volatilization Rate(% by mass)=100×(A/Oil Absorption)  (Expression 1)

TABLE 1

|  | Drying time (second) | Volatilization rate (% by mass) | Support layer thickness (μm) |
|---|---|---|---|
| Example 1 | 60 | 10 | 70 |
|  | 180 | 21 | 150 |
|  | 300 | 26 | 190 |
|  | 600 | 39 | 300 |
|  | 1200 | 63 | 560 |
|  | 3600 | 100 | 2000 |

The results in Table 1 show that both the volatilization rate and the support layer thickness increased depending on the increase in the drying time. These results prove that toluene in the inner part of the carrier continues to volatilize as the drying time of the carrier advances, so that the platinum salt can easily enter deeply into the inner part of the carrier in the case where the carrier is brought into contact with the aqueous platinum salt solution.

Further, it was found that when the volatilization rate was 39% by mass or less, the support layer thickness was 300 μm or less, and the catalytic metal can be effectively carried on the surface of the carrier and its vicinity.

Second Embodiment

The same treatment as in the first embodiment was performed using the hydrophobic organic compounds as shown in Table 2.

TABLE 2

| Compound name | Molecular weight | Vapor pressure (mmHg · 25° C.) | Boiling point (° C.) | Solubility (g/100 ml) |
|---|---|---|---|---|
| Toluene | 92 | 22 | 111 | $5.4 \times 10^{-2}$ |
| Pentane | 72 | 514 | 36 | $4.0 \times 10^{-2}$ |
| Heptane | 100 | 46 | 98 | $3.4 \times 10^{-4}$ |
| Hexane | 86 | 120 | 69 | $1.3 \times 10^{-3}$ |
| Octane | 114 | 10 | 126 | $6.6 \times 10^{-5}$ |
| Decane | 142 | 1.4 | 174 | $5.2 \times 10^{-4}$ |
| p-Xylene | 106 | 16 | 138 | $2.0 \times 10^{-2}$ |
| Ethyl acetate | 88 | 75 | 77.1 | 8.3 |

The volatilization rate was calculated, and the cross section of the carrier was observed with EPMA to determine the support layer thickness, in the same manner as in the first embodiment. Table 3 shows the results of the relationship among the drying time of the carrier, the volatilization rate, and the support layer thickness.

TABLE 3

|  | Hydrophobic organic compound | Drying time (second) | Volatilization rate (% by mass) | Support layer thickness (μm) |
|---|---|---|---|---|
| Example 2 | Pentane | 60 | 39 | 300 |
|  |  | 180 | 76 | 750 |
|  |  | 300 | 94 | 1200 |
|  |  | 600 | 100 | 2000 |
|  |  | 1200 | 100 | 2000 |
|  |  | 3600 | 100 | 2000 |
| Example 3 | Hexane | 60 | 39 | 300 |
|  |  | 180 | 71 | 680 |
|  |  | 300 | 88 | 1010 |
|  |  | 600 | 100 | 2000 |
|  |  | 1200 | 100 | 2000 |
|  |  | 3600 | 100 | 2000 |
| Example 4 | Heptane | 60 | 39 | 300 |
|  |  | 180 | 49 | 400 |
|  |  | 300 | 55 | 470 |
|  |  | 600 | 66 | 600 |
|  |  | 1200 | 77 | 780 |
|  |  | 3600 | 92 | 1150 |
| Example 5 | Octane | 60 | 21 | 150 |
|  |  | 180 | 35 | 270 |
|  |  | 300 | 36 | 280 |
|  |  | 600 | 46 | 370 |
|  |  | 1200 | 57 | 490 |
|  |  | 3600 | 78 | 800 |
| Example 6 | Decane | 60 | 21 | 150 |
|  |  | 180 | 36 | 280 |
|  |  | 300 | 44 | 350 |
|  |  | 600 | 50 | 410 |
|  |  | 1200 | 58 | 500 |
|  |  | 3600 | 68 | 630 |
| Example 7 | p-Xylene | 60 | 2 | 15 |
|  |  | 180 | 10 | 70 |
|  |  | 300 | 13 | 90 |
|  |  | 600 | 18 | 130 |
|  |  | 1200 | 33 | 250 |
|  |  | 3600 | 75 | 740 |
| Example 8 | Ethyl acetate | 60 | 44 | 350 |
|  |  | 180 | 53 | 450 |
|  |  | 300 | 66 | 600 |
|  |  | 600 | 90 | 1050 |
|  |  | 1200 | 100 | 2000 |
|  |  | 3600 | 100 | 2000 |

The support layer thickness increased as the drying time advances as in the results of the first embodiment (Table 1). Further, although the support layer thickness was influenced by the rate at which a hydrophobic organic compound volatilizes, the same tendency as in the results of the first embodiment was observed in the relationship between the volatilization rate and the support layer thickness. From the above results, the control effect of the support layer thickness was not dependent on the type of the hydrophobic organic compound, and a certain control effect was observed even in the case where the type of the hydrophobic organic compound was different.

FIG. 1 shows the relationship between the drying time and the support layer thickness in the case of using various types of hydrophobic organic compounds in the first embodiment and the second embodiment. This view shows that although the volatilization characteristics of hydrophobic organic compounds are respectively different, the catalyst can be effectively carried on the surface of the carrier and its vicinity by controlling the drying time even in the case where any hydrophobic organic compound is used.

Third Embodiment

The oxide-based ceramics and catalytic metal salts shown in Table 4 were used to perform the same treatment as in the first embodiment, and then the support layer thickness of the catalysts was measured.

TABLE 4

|  | Carrier type | Catalytic metal salt |
|---|---|---|
| Example 9 | γ-Alumina | Aqueous rhodium nitrate solution |
| Example 10 | γ-Alumina | Aqueous silver nitrate solution |
| Example 11 | γ-Alumina | Aqueous chloroauric acid solution |
| Example 12 | α-Alumina | Aqueous ruthenium nitrate solution |
| Example 13 | α-Alumina | Aqueous iridium chloride solution |
| Example 14 | α-Alumina | Aqueous palladium nitrate solution |
| Example 15 | α-Alumina | Palladium nitrate/dinitrodiamine platinum mixed solution |
| Example 16 | Silica | Aqueous chloroplatinic acid solution |
| Example 17 | Zeolite (ZSM-5) | Aqueous platinum nitrate solution |
| Example 18 | Zirconia | Aqueous tetraammineplatinum solution |

Comparative Example

The same carrier as in the first embodiment was immersed in a beaker containing toluene until the carrier was impregnated with toluene in an amount of the total amount (100% by mass) of the oil absorption of the carrier. Then, the carrier was immediately immersed in a beaker containing an aqueous platinum salt solution without performing a drying treatment for volatilizing toluene on the surface of the carrier and was subsequently immersed in an aqueous ammonia solution.

Conventional Example

The same carrier as in the first embodiment was immersed in a beaker containing an aqueous platinum salt solution for a predetermined time in ordinary temperature (20° C.) and ordinary pressure conditions without any pretreatment, thereby saturating the carrier with water. Then, the carrier was quickly pulled out of the beaker and immersed in an aqueous ammonia solution to thereby deposit a platinum salt on the surface of the carrier. After the deposition of the platinum salt, the carrier was dried at 120° C. for 1 two hours to remove the water in the inner part of the carrier.

After the above treatment was performed, the cross section of the carrier was subjected to EPMA observation in the same manner as in the first embodiment. Table 5 shows the results of the relationship between the drying time of the carrier and the support layer thickness.

TABLE 5

|  | Drying time (second) | Volatilization rate (% by mass) | Support layer thickness (μm) |
|---|---|---|---|
| Example 9 | 300 | 22 | 160 |
| Example 10 | 300 | 20 | 140 |
| Example 11 | 300 | 20 | 140 |
| Example 12 | 300 | 21 | 150 |
| Example 13 | 300 | 22 | 160 |
| Example 14 | 300 | 21 | 150 |
| Example 15 | 300 | 22 | 160 |
| Example 16 | 300 | 21 | 150 |
| Example 17 | 300 | 23 | 170 |
| Example 18 | 300 | 20 | 140 |
| Comparative Example | 0 | 0 | 0 |
| Conventional Example | 0 | 0 | 2000 |

The results of Table 5 show that the control action on the support layer thickness was remarkable by the treatment of impregnating the carrier with the hydrophobic organic compound into the inner part of the carrier and then volatilizing this organic compound on the surface of the carrier, compared with Comparative Example and Conventional Example. Further, the effect of controlling the support layer thickness was not dependent on the types of the carrier and the catalytic metal salt, and a certain control effect was observed even in the case where their types were different. Similarly, the volatilization rate of the hydrophobic organic compound was not dependent on the type of the carrier, and was almost constant. From these results, it is obvious that, according to the method of the present invention, the catalytic metal can be supported densely on the surface part of the carrier, thereby increasing the effective catalytic component which contributes to a catalytic reaction. Consequently, the loss of the catalytic component will be reduced, and the production cost will also be lowered.

In addition, the carriers subjected to the same treatment as in Examples 1 to 17 were heat-treated at 200° C. to 600° C. for two hours to thereby bond the carrier and the catalytic metal. As a result, the support layer thickness remained unchanged through the heat treatment, and it was verified that heat treatment did not influence the support layer thickness.

Fourth Embodiment

Here, the performance of the catalysts produced as described above was evaluated. The target catalysts for evaluation were as follows: the catalysts having a support layer thickness of 70 μm, 300 μm, and 560 μm in Example 1, the catalyst having a support layer thickness of 15 μm in Example 7, and the catalyst in which the supported depth is not adjusted in Conventional Example. The test was performed as follows: A fixed bed reactor was filled with 50 g of a catalyst, and therethrough was passed air mixed with 1000 ppm of organic matter (benzene, toluene, or cyclohexane) (SV30000 h$^{-1}$), and the purification rate was measured with a total hydrocarbon analyzer. In this test, the heating temperature of the catalyst was changed, and the purification rate at each temperature was measured. The test results are shown in Tables 6 to 8.

TABLE 6

Target gas: benzene/air

| Catalyst temperature | Support layer thickness | | | | With no adjustment |
|---|---|---|---|---|---|
|  | 15 μm | 70 μm | 300 μm | 560 μm |  |
| 150° C. | 0% | 0% | 0% | 0% | 0% |
| 160° C. | 0% | 10% | 10% | 10% | 0% |
| 170° C. | 40% | 60% | 60% | 40% | 20% |
| 180° C. | 60% | 100% | 100% | 100% | 60% |
| 190° C. | 60% | 100% | 100% | 100% | 90% |
| 200° C. | 70% | 100% | 100% | 100% | 100% |
| 210° C. | 70% | 100% | 100% | 100% | 100% |
| 220° C. | 80% | 100% | 100% | 100% | 100% |

TABLE 7

Target gas: toluene/air

| Catalyst temperature | Support layer thickness | | | | With no adjustment |
|---|---|---|---|---|---|
|  | 15 μm | 70 μm | 300 μm | 560 μm |  |
| 150° C. | 0% | 0% | 0% | 0% | 0% |
| 160° C. | 0% | 10% | 10% | 0% | 0% |
| 170° C. | 10% | 15% | 10% | 10% | 5% |
| 180° C. | 50% | 70% | 45% | 30% | 30% |
| 190° C. | 80% | 100% | 100% | 100% | 70% |

TABLE 7-continued

Target gas: toluene/air

| Catalyst temperature | Support layer thickness | | | | With no adjustment |
|---|---|---|---|---|---|
| | 15 μm | 70 μm | 300 μm | 560 μm | |
| 200° C. | 80% | 100% | 100% | 100% | 100% |
| 210° C. | 85% | 100% | 100% | 100% | 100% |
| 220° C. | 85% | 100% | 100% | 100% | 100% |

TABLE 8

Target gas: cyclohexane/air

| Catalyst temperature | Support layer thickness | | | | With no adjustment |
|---|---|---|---|---|---|
| | 15 μm | 70 μm | 300 μm | 560 μm | |
| 150° C. | 0% | 0% | 0% | 0% | 0% |
| 160° C. | 0% | 0% | 0% | 0% | 0% |
| 170° C. | 0% | 0% | 0% | 0% | 0% |
| 180° C. | 0% | 10% | 0% | 0% | 0% |
| 190° C. | 10% | 20% | 10% | 10% | 0% |
| 200° C. | 10% | 100% | 80% | 70% | 15% |
| 210° C. | 40% | 100% | 100% | 100% | 90% |
| 220° C. | 80% | 100% | 100% | 100% | 100% |

These test results show that although active temperature is different depending on an object to be treated, the catalysts in which the support layer thickness (supported depth) has been adjusted have an improved purification rate at the same active temperature. It is also understood that the support layer thickness should be set at 50 μm or more and 500 μm or less, preferably at 70 μm or more and 300 μm or less.

INDUSTRIAL APPLICABILITY

The present invention relates to a method for supporting a catalytic metal on the surface of a carrier. According to the production method of the present invention, the catalytic metal can be effectively supported on the surface of the carrier and its vicinity, and thereby a surface-supported catalyst having high catalytic activity can be produced inexpensively and in a simpler manner.

What is claimed is:

1. A method for supporting a catalytic metal on a surface of a carrier by bringing an aqueous catalytic metal salt solution into contact with a porous carrier, the method comprising the steps of:

impregnating the carrier with a liquid hydrophobic organic compound by an amount 50% by mass to 100% by mass of oil absorption of the carrier before bringing the aqueous catalytic metal salt solution into contact with the carrier, said organic compound comprising at least one of pentane, hexane, heptane, octane, nonan, decane, toluene, and xylene, drying the impregnated carrier to volatilize the hydrophobic organic compound by 10% by mass to 75% by mass of the compound, followed by bringing the carrier into contact with the aqueous catalytic metal salt solution; and then bringing a reducing agent into contact with the catalytic metal salt on the surface of the carrier to reduce the catalytic metal salt to undergo insolubilization treatment.

2. The method for supporting a catalytic metal on the surface of a carrier according to claim 1 wherein the carrier is an oxide-based ceramic.

3. The method for supporting a catalytic metal on the surface of a carrier according to claim 1 wherein the shape of the carrier is any of a spherical shape, a rod shape, a cylindrical shape, and a hollow cylindrical shape.

4. The method for supporting a catalytic metal on the surface of a carrier according to claim 2 wherein the shape of the carrier is any of a spherical shape, a rod shape, a cylindrical shape, and a hollow cylindrical shape.

* * * * *